United States Patent
Sudbrink et al.

(10) Patent No.: US 10,085,371 B2
(45) Date of Patent: Oct. 2, 2018

(54) STEERABLE REAR AXLE ON A FIELD CULTIVATOR

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 218 days.

(21) Appl. No.: 14/547,634

(22) Filed: Nov. 19, 2014

(65) Prior Publication Data
US 2015/0156953 A1    Jun. 11, 2015

Related U.S. Application Data

(60) Provisional application No. 61/914,641, filed on Dec. 11, 2013.

(51) Int. Cl.
  *A01B 63/22*  (2006.01)
  *A01B 69/00*  (2006.01)

(52) U.S. Cl.
  CPC ........... *A01B 69/003* (2013.01); *A01B 63/22* (2013.01)

(58) Field of Classification Search
  CPC ....... A01B 73/00; A01B 63/16; A01B 63/006; A01B 63/22; A01B 63/002
  See application file for complete search history.

(56) References Cited

U.S. PATENT DOCUMENTS

| 3,212,793 | A | * | 10/1965 | Pietroroia | B62D 13/04 180/434 |
| 4,009,556 | A | | 3/1977 | Molzahn | |
| 4,184,551 | A | | 1/1980 | Orthman | |
| 4,219,208 | A | * | 8/1980 | Fuller | B62D 7/08 116/31 |
| 4,272,097 | A | * | 6/1981 | Cornelius | B62D 49/065 172/311 |
| 6,131,691 | A | | 10/2000 | Morch | |
| 6,158,759 | A | | 10/2000 | Perry | |

(Continued)

FOREIGN PATENT DOCUMENTS

| DE | 197 02 888 A1 | 1/1999 |
| EP | 1 088 743 A1 | 4/2001 |

(Continued)

*Primary Examiner* — Matthew D Troutman
(74) *Attorney, Agent, or Firm* — Rebecca L. Henkel; Rickard K. DeMille

(57) ABSTRACT

An agricultural tillage implement has a steerable rear axle which facilitates the implement more faithfully following a towing unit. The implement has a solid axle mounted to the main pull frame that allows for vertical movement of the implement to switch between field operation and a transport configuration. Attached to the solid axle are two steering knuckles that are tied together by an adjustable tie rod and two hydraulic steering cylinders. On each knuckle is a set of walking tandems to which the tires are mounted. The two cylinders are connected to an auxiliary port in a towing traction unit to enable the steering function without having to turn the unit steering wheel. The arrangement allows the steering knuckles to turn up to 25 degrees in either direction.

8 Claims, 5 Drawing Sheets

(56) References Cited

U.S. PATENT DOCUMENTS

| | | | |
|---|---|---|---|
| 6,205,757 B1 * | 3/2001 | Dow | A01D 57/20 56/366 |
| 6,267,198 B1 | 7/2001 | Hurlburt et al. | |
| 7,310,929 B2 * | 12/2007 | Dow | A01B 73/02 172/311 |
| 7,849,932 B2 | 12/2010 | Friggstad et al. | |
| 7,971,886 B2 | 7/2011 | Neudorf et al. | |
| 8,186,138 B2 * | 5/2012 | Dow | A01B 73/02 56/15.8 |
| 8,342,255 B2 | 1/2013 | Connors et al. | |
| 8,353,377 B2 | 1/2013 | Geiger et al. | |
| 8,428,831 B2 | 4/2013 | Thompson et al. | |
| 8,626,390 B2 * | 1/2014 | Prickel | A01B 69/006 701/41 |
| 8,818,652 B2 * | 8/2014 | Thompson | A01B 69/004 172/2 |
| 8,863,488 B2 * | 10/2014 | Dow | A01B 73/02 56/192 |
| 9,072,214 B2 * | 7/2015 | Connors | A01B 63/006 |
| 9,096,264 B2 * | 8/2015 | Connors | A01B 69/003 |
| 2005/0126153 A1 * | 6/2005 | Hironimus | A01D 84/00 56/354 |
| 2006/0254244 A1 * | 11/2006 | Geiser | A01B 73/02 56/370 |
| 2008/0289897 A1 | 11/2008 | Williams | |
| 2009/0032273 A1 | 2/2009 | Hahn | |
| 2009/0184491 A1 * | 7/2009 | Neudorf | A01D 34/64 280/442 |
| 2009/0272551 A1 * | 11/2009 | Thompson | A01B 69/003 172/284 |
| 2009/0273160 A1 * | 11/2009 | Friggstad | A01B 63/22 280/442 |
| 2011/0100656 A1 * | 5/2011 | Connors | A01B 63/006 172/278 |
| 2011/0100657 A1 * | 5/2011 | Connors | A01B 73/00 172/439 |
| 2011/0315234 A1 | 12/2011 | Diaz et al. | |
| 2012/0185133 A1 | 7/2012 | Prickel et al. | |

FOREIGN PATENT DOCUMENTS

| | | |
|---|---|---|
| EP | 1 449 745 A1 | 8/2004 |
| WO | 2005/100133 A1 | 10/2005 |

* cited by examiner

STEERABLE REAR AXLE ON A FIELD CULTIVATOR

CROSS REFERENCE TO RELATED APPLICATIONS

This is a non-provisional application based upon U.S. provisional patent application Ser. No. 61/914,641, entitled "STEERABLE REAR AXLE ON A FIELD CULTIVATOR", filed Dec. 11, 2013, which is incorporated herein by reference.

BACKGROUND OF THE INVENTION

1. Field of the Invention

The present invention relates to agricultural tillage implements, and, more particularly, to agricultural field cultivators.

2. Description of the Related Art

Farmers utilize a wide variety of tillage implements to prepare the soil for planting. Field cultivating implements such as harrows include, in addition to the actual soil working tools such as harrow tines or disks, a set of wheels which are deployed when moving the implement between work sites and/or storage locations. The wheels may also be employed to engage the farm field surface and control the depth or penetration of the soil working tools into the earth.

Over the years, these implements have become larger, particularly in width, and nearly impossible to transport on public roads between worksites. Configuring the implement with outboard wing sections and techniques for pivoting those sections upwardly and/or inwardly for a transport mode of operation has been a successful solution to this problem, however this often results in a relatively long configuration which is difficult to maneuver around corners and into narrow openings such a farm field gates and storage sheds. Current machines have a fixed axle that does not allow turning and the implement will not follow the same turn line as the tractor.

What is needed in the art is a technique for allowing a towed tillage implement to more faithfully follow the path of a towing traction unit.

SUMMARY OF THE INVENTION

The present invention provides steerability to a towed tillage implement which may be independent of any towing vehicle steering controls.

The invention in one form is directed to steering assembly for an agricultural tillage implement. The implement is convertible between soil tilling and transport modes having a number of rearmost wheels which engage the ground in both the soil tilling and transport modes. The steering assembly controls these rearmost wheels and includes a suspension bracket which pivotably depends from the implement and a transverse axle fixed to the suspension bracket. A pair of wheel assemblies, one fixed near each end of the transverse axle provide pivotable attachment for the rearmost wheels. A pair of hydraulic cylinders, each have a first end coupled to a respective wheel assembly, control the pivotal motion. A rigid transverse bar is fixed to the suspension bracket and coupled near opposite ends thereof to respective second hydraulic cylinder ends.

The invention in another form is directed to an agricultural tillage implement operable in either a soil tilling mode or a transport mode. The implement includes a main frame section adapted to be coupled to and towed by a traction unit in a generally horizontal forward direction of travel with a plurality of generally downwardly depending soil working tools suspended from the main frame section and movable between a lowered soil tilling position and a retracted position stowed for transport. A rearmost central set of wheels is operable in the transport mode to support the rear portion of the tillage implement and operable as lift wheels in the tilling mode. A steering assembly controls the rearmost central set of wheels and includes a suspension bracket pivotably depending from the main frame section with a transverse axle fixed to the suspension bracket. A first flange is fixed to the transverse axle near a first axle end, and a second flange is fixed to the transverse axle near a second axle end. A hydraulic cylinder which is fixed to the main frame section at one end and to the transverse axle at the other end selectively pivots the steering assembly moving the rearmost central set of wheels between transport and tilling mode positions. The steering assembly additionally has first and second wheel assemblies including first and second steering knuckles with at least one of the rearmost central set of wheels depending from each, and first and second king pins pivotably joining the first and second steering knuckles to their respective fixed flanges. A first hydraulic cylinder has one end coupled to the first steering knuckle and another end fixed relative to the transverse axle for selectively pivoting the first steering knuckle and the associated at least one wheel about the first king pin. A second hydraulic cylinder has one end coupled to the second steering knuckle and another end fixed relative to the transverse axle for selectively pivoting the second steering knuckle and its one wheel about the second king pin. There is a tie rod joining the first and second steering knuckles for conjoint pivotal motion about their respective king pins.

The invention in a further form is directed to a steering assembly for an agricultural tillage implement. The implement is of a type operable in either a soil tilling mode or a transport mode. The implement has a number of rearmost wheels which engage the ground in both the soil tilling and transport modes. The steering assembly controls the rearmost central wheels and includes a suspension bracket pivotably depending from the implement with a transverse axle fixed to the suspension bracket. There are first and second flanges fixed to the transverse axle near first and second opposed axle ends. A hydraulic cylinder is fixed to the implement at one end and to the transverse axle at the other end for selectively pivoting the steering assembly and moving the rearmost central set of wheels between transport and tilling mode positions. First and second wheel assemblies each include a steering knuckle with at least one of the rearmost central set of wheels depending therefrom, and a king pin pivotably joining the steering knuckle to its respective fixed flange. At least one hydraulic cylinder has one end coupled to a steering knuckle and another end fixed relative to the transverse axle for selectively pivoting the steering knuckle and wheel about its king pin. A tie rod joins the first and second steering knuckles for conjoint pivotal motion about their respective king pins.

An advantage of the present invention is relatively large machinery can be fit into comparatively smaller openings or spaces.

Another advantage is the tillage implement can be made to faithfully follow the path of a towing unit.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
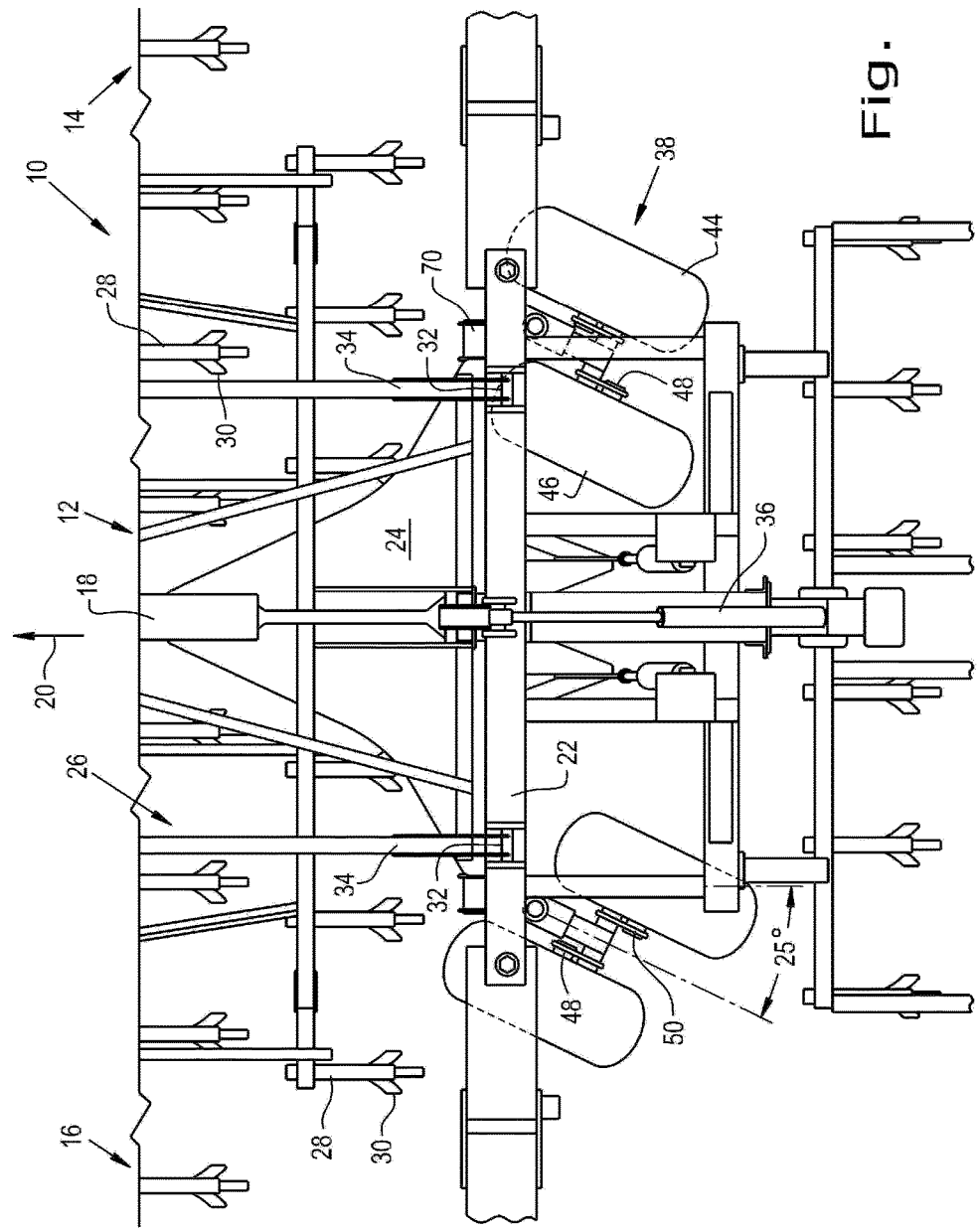
FIG. 1 is a top view of a portion of an agricultural tillage implement incorporating the invention in one form.

Referring now to the drawings, and more particularly to FIG. 1, there is shown a portion of an agricultural tillage implement such as a field cultivator 10 which generally includes a main frame section 12 and two or more laterally positioned wing portions such as right wing section 14 and left wing section 16. Additional wing section may be positioned laterally beyond those illustrated.

Main frame section 12 is the center section that is directly towed by a traction unit, such as an agricultural tractor (not shown). Main frame section 12 includes a pull hitch tube 18 extending in a travel direction 20, and a tool bar 22 which is coupled with and extends transverse to pull hitch tube 18. Reinforcing gusset plates 24 may be used to strengthen the connection between pull hitch tube 18 and tool bar 22. Main frame section 12 generally functions to carry a shank frame 26 having soil working tools for tilling the soil and, optional, rear auxiliary implements for finishing the soil.

Shank frame 26 generally functions to carry cultivator shanks 28 with shovels 30 at their lower ends for tilling the soil. Shank frame 26 is pivotally coupled with tool bar 22, preferably at the top of tool bar 22, such as with couplings 32. Shank frame 28 is positioned in front of the tool bar 22 when in an operating position, and is foldable up and over the tool bar 22 to a position rearward of tool bar 22 when in a transport position. Shank frame 26 includes longitudinal frame members 34 which are pivotally coupled with tool bar 22 at one end thereof using couplings 32. Hydraulic cylinder 36 is operable to fold the shank frame 26 from the operating position to the transport position and vice versa.

Figure 2:
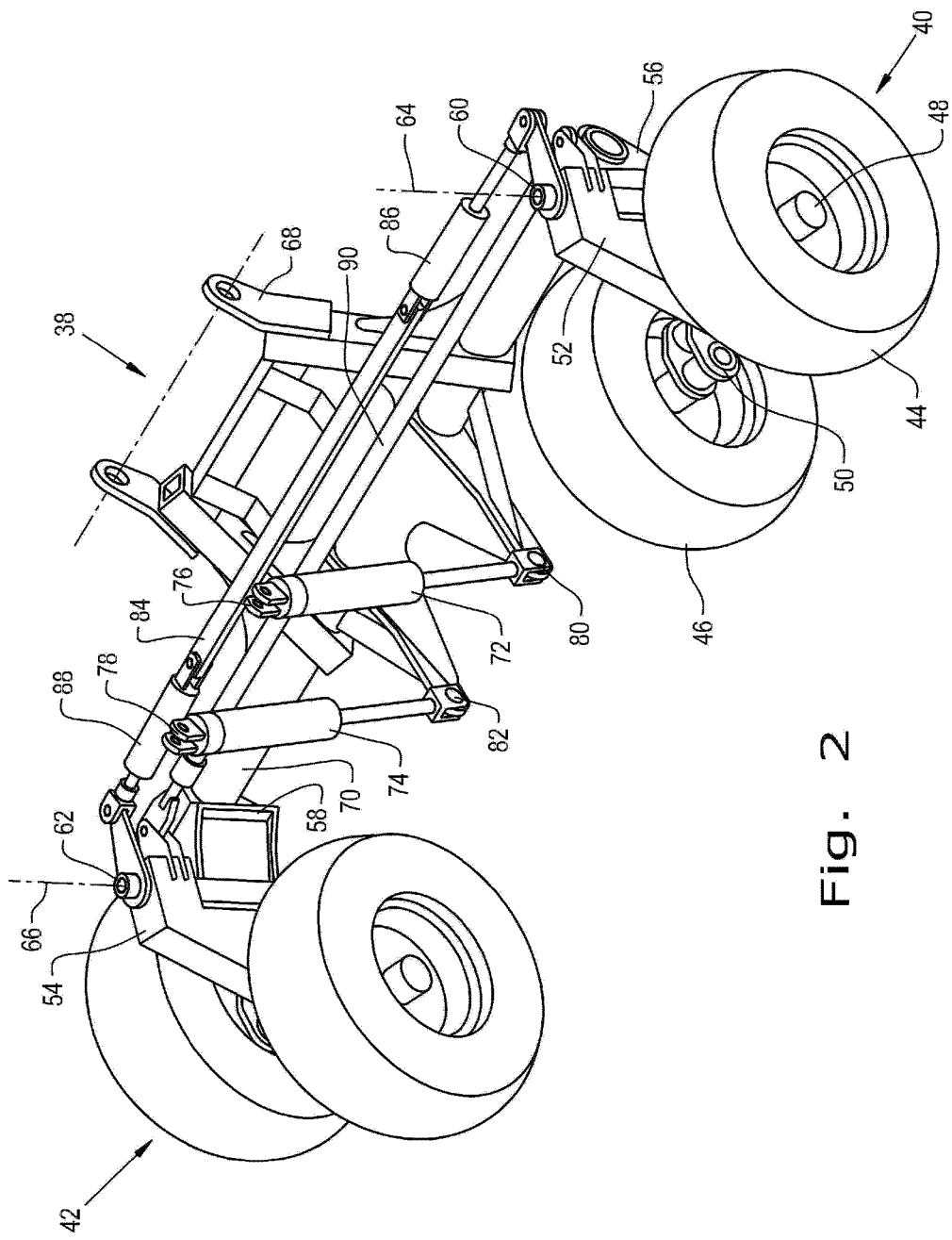
FIG. 2 is an isometric view of the rear wheel steering assembly of FIG. 1 with the wheels oriented for the implement to follow a traction unit left turn.
Figure 3:
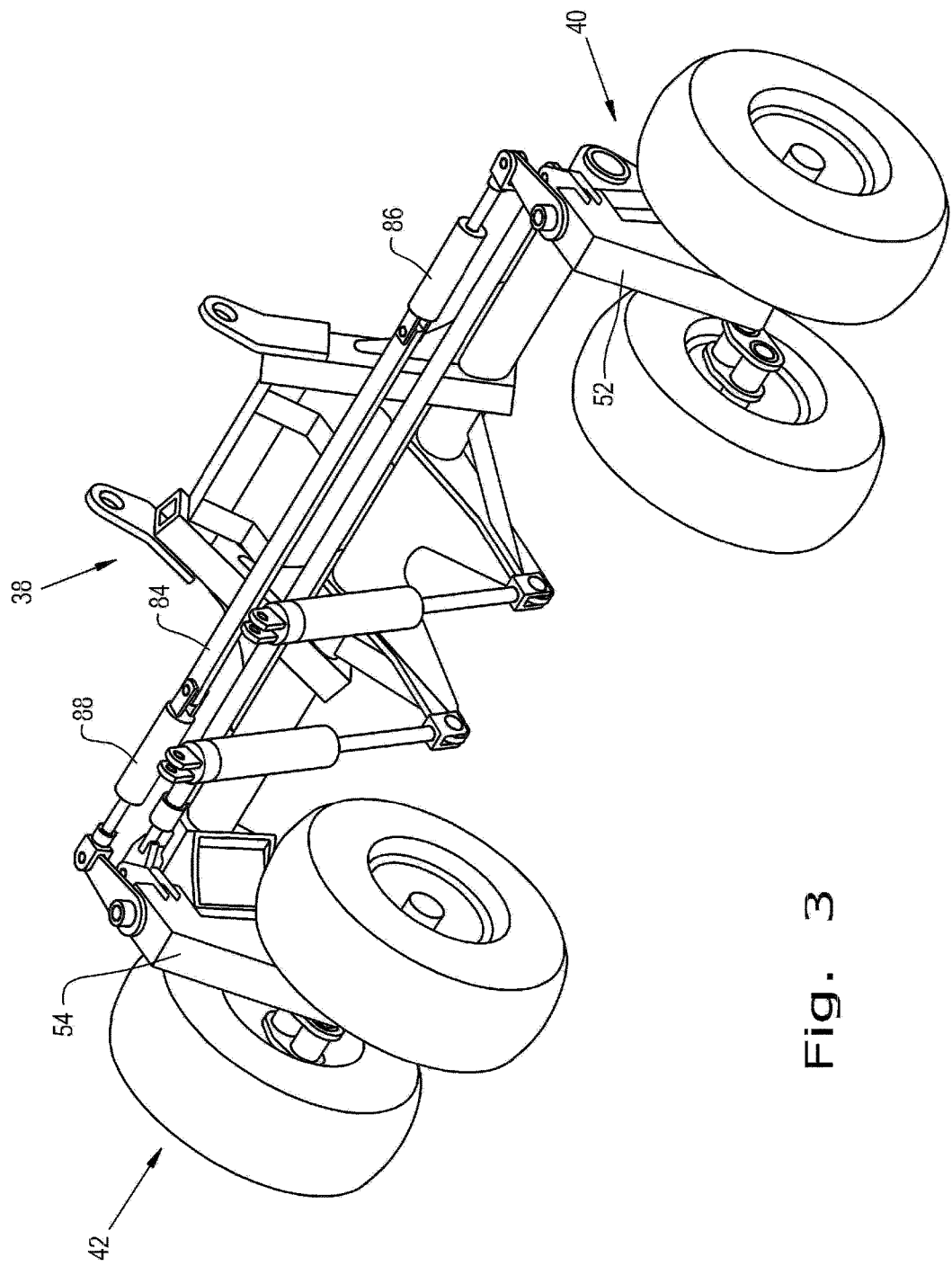
FIG. 3 is an isometric view of the rear wheel steering assembly of FIG. 1 with the wheels oriented for straight forward implement motion.
Figure 4:
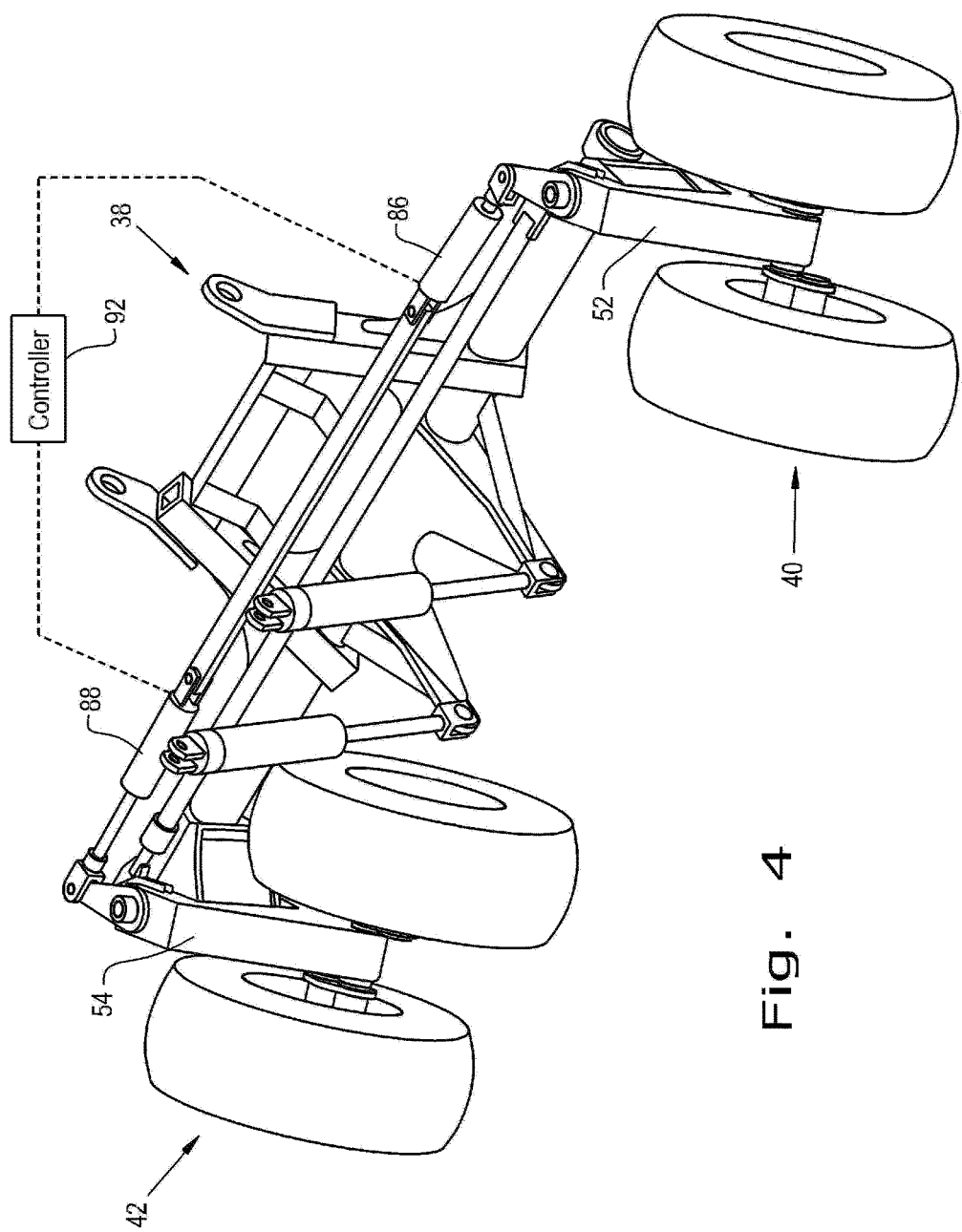
FIG. 4 is an isometric view of the rear wheel steering assembly of FIG. 1 with the wheels oriented for the implement to follow a traction unit right turn.

Additional shank frames located on the right and left wing sections may be hydraulically pivoted into vertical positions and/or folded forwardly to lie closely along the implement axis. This results in a long implement configuration in the transport mode which may be readily towed on highways, but is difficult to turn particularly when entering or leaving farm fields or storage building entrances. Failure of the implement to faithfully follow the towing unit is solved by making the rear implement wheels steerable as best seen in FIGS. 2-4.

Figure 5:
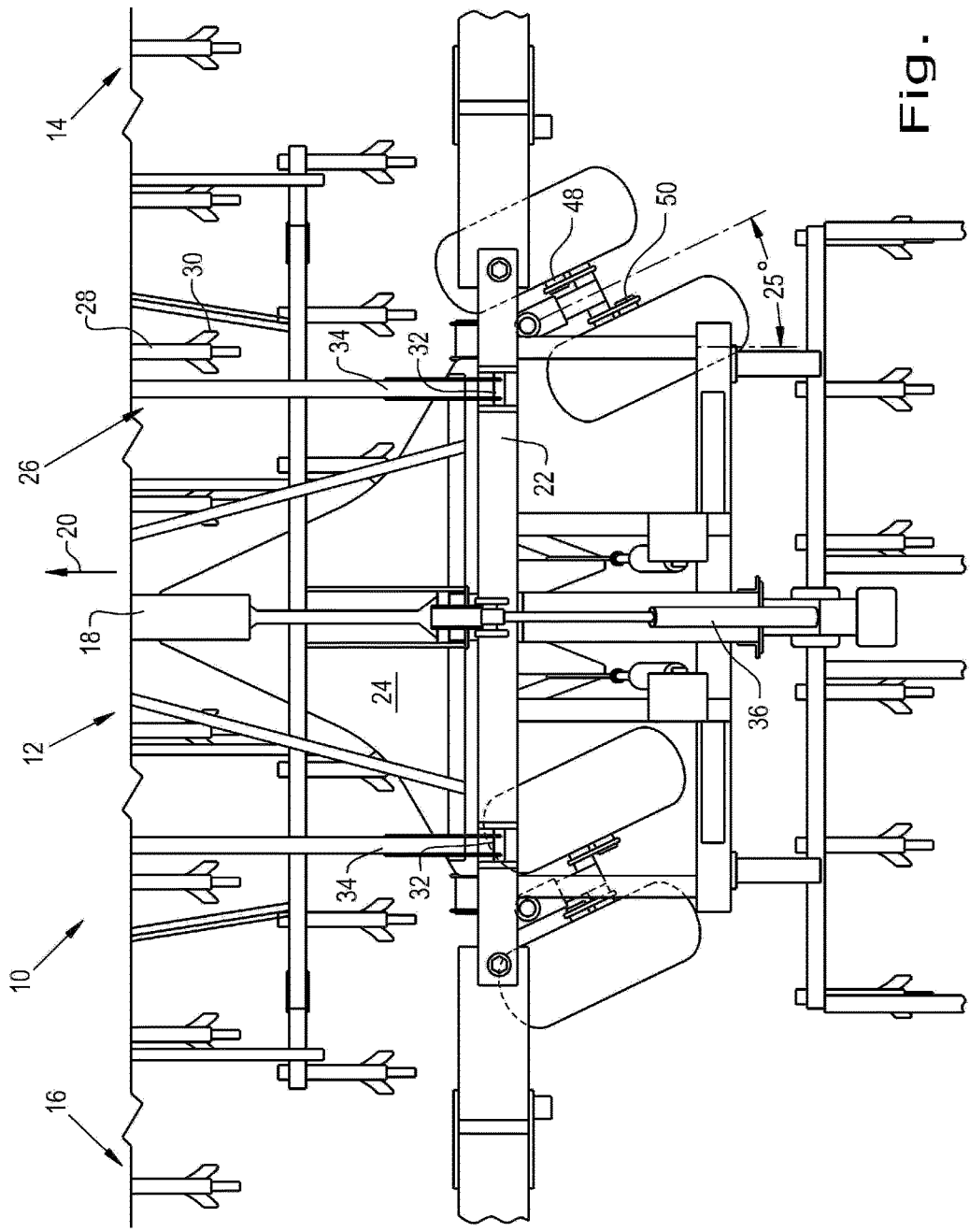
FIG. 5 is a view similar to FIG. 1, but illustrating the wheel orientation of FIG. 4.

The steering assembly 38 includes two wheel assemblies 40 and 42 each consisting of a walking tandem having two wheels such as 44 and 46 on spaced apart parallel axles 48 and 50. The axles extend from steering knuckles 52 and 54. The knuckles 52 and 54 are pivotably supported on fixed flanges 56 and 58 by king pins 60 and 62 for pivotal movement about axes 64 and 66. A range of rear wheel steering up to 25 degrees in either direction from neutral or forward is seen in comparing FIGS. 1 and 5.

The steering assembly 38 is suspended beneath the main frame section 12 by a pivotable suspension bracket 68 to which is fastened a transverse axle 70. The steering assembly is movable between extended and retracted positions by a pair of lift cylinders 72 and 74. These cylinders extend downward from clevises 76 and 78 which are pinned or bolted to the main frame section and terminate at lift arms 80 and 82 which are fixed to and extend laterally from the transverse axle 70.

A rigid transverse bar 84 is fixed to the suspension bracket 68 and supports first and second hydraulic steering cylinders 86 and 88. These cylinders may be coupled to an auxiliary port in the towing unit and be operator controllable independent of the towing unit normal steering mechanism. For example, in changing the wheel orientation from that shown in FIG. 2 to that shown in FIG. 3, cylinder 88 is enabled to extend its piston rod while the piston rod of cylinder 86 is allowed to retract. The cylinders may be operable to effect rear wheel steering in both transport and tilling modes, or may be disabled during tilling as desired. Rather than two cylinders, a single cylinder mounted between links may be employed. A tie rod 90 joins the first and second knuckles 52 and 54 for conjoint pivotal motion about their respective king pins 60 and 62. The tie rod may be adjustable if desired.

The cylinders 86 and 88 may also be coupled to and under the control of a controller 92, by way of an intervening hydraulic actuator (not shown), as shown in FIG. 4. Controller 92 may be located in the traction unit and be operator controllable independent of the traction unit normal steering mechanism as noted earlier, or may be linked to the traction unit steering mechanism to respond to operator steering actions and aid the tilling implement to more faithfully follow the towing unit through significant turns.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement operable in either a soil tilling mode or a transport mode, comprising:
   a main frame section adapted to be coupled to and towed by a traction unit in a direction of travel, wherein the main frame section extends in a direction that is substantially perpendicular to the direction of travel;
   a plurality of generally downwardly depending soil working tools suspended from the main frame section and movable between a lowered soil tilling position and a retracted position stowed for transport;
   a rearmost central set of wheels operable in the transport mode to support the rear portion of the tillage implement and as lift wheels in the tilling mode; and a steering assembly controlling the rearmost central set of wheels and located reward of the main frame section relative to the direction of travel, said steering assembly comprising:
- a suspension bracket pivotably depending from the main frame section;
- a transverse axle fixed to the suspension bracket;
- a first flange fixed to the transverse axle near a first axle end, and a second flange fixed to the transverse axle near a second axle end;
- at least one hydraulic cylinder fixed to the main frame section at one end and to the transverse axle at the other end for selectively pivoting the steering assembly and moving the rearmost central set of wheels between transport and tilling mode positions;
- a first wheel assembly including a first steering knuckle with at least one of the rearmost central set of wheels depending therefrom, and a first king pin pivotably joining the first steering knuckle to the first fixed flange;
- a second wheel assembly including a second steering knuckle with at least a second one of the rearmost central set of wheels depending therefrom, and a second king pin pivotably joining the second steering knuckle to the second fixed flange;
- a first hydraulic cylinder having one end coupled to the first steering knuckle and another end fixed relative to the transverse axle for selectively pivoting the first steering knuckle and said at least one wheel of the rearmost central set of wheels about said first king pin;
- a second hydraulic cylinder having one end coupled to the second steering knuckle and another end fixed relative to the transverse axle for selectively pivoting the second steering knuckle and said second at least one wheel of the rearmost central set of wheels about said second king pin, wherein the first and second hydraulic cylinders are fixed to opposing ends of the transverse axle;
- a tie rod joining the first and second steering knuckles for conjoint pivotal motion about their respective king pins; and
- a rigid transverse bar fixed to the suspension bracket and supporting the first and second hydraulic cylinders near opposite ends thereof,
- wherein the first and second hydraulic cylinders are configured to extend and retract in a direction substantially parallel to a longitudinal axis of the transverse axle to control said selective pivoting of the first steering knuckle and said at least one wheel about said first king pin and the second steering knuckle and said second at least one wheel about said second king pin.

2. The agricultural tillage implement of claim 1, wherein the first and second wheel assemblies each include a walking tandem arrangement having two spaced apart generally parallel axles each supporting a wheel.

3. The agricultural tillage implement of claim 1, wherein the conjoint pivotal motion about the respective king pins extends about 25 degrees to either side of a neutral forward position.

4. The agricultural tillage implement of claim 1, wherein the first and second hydraulic cylinders are configured to be operator actuable independent of the traction unit steering mechanism.

5. A steering assembly for an agricultural tillage implement, the implement operable in either a soil tilling mode or a transport mode and having a number of rearmost wheels which engage the ground in the soil tilling and transport modes, said steering assembly comprising:
- a suspension bracket pivotably depending from the implement;
- a transverse axle fixed to the suspension bracket;
- a first flange fixed to the transverse axle near a first axle end, and a second flange fixed to the transverse axle near a second axle end;
- at least one hydraulic cylinder fixed to the implement at one end and to the transverse axle at the other end for selectively pivoting the steering assembly and moving the rearmost central set of wheels between transport and tilling mode positions;
- a first wheel assembly including a first steering knuckle with at least one of the rearmost central set of wheels depending therefrom, and a first king pin pivotably joining the first steering knuckle to the first fixed flange;
- a second wheel assembly including a second steering knuckle with at least a second one of the rearmost central set of wheels depending therefrom, and a second king pin pivotably joining the second steering knuckle to the second fixed flange;
- a first hydraulic cylinder having one end coupled to the first steering knuckle and another end fixed relative to the transverse axle for selectively pivoting the first steering knuckle and said at least one wheel of the rearmost central set of wheels about said first king pin;
- a second hydraulic cylinder having one end coupled to the second steering knuckle and another end fixed relative to the transverse axle for selectively pivoting the second steering knuckle and said second at least one wheel of the rearmost central set of wheels about said second king pin, wherein the first and second hydraulic cylinders are fixed to opposing ends of the transverse axle;
- a tie rod joining the first and second steering knuckles for conjoint pivotal motion about their respective king pins; and
- a rigid transverse bar fixed to the suspension bracket and supporting the first and second hydraulic cylinders near opposite ends thereof,
- wherein the first and second hydraulic cylinders are configured to extend and retract in a direction substantially parallel to a longitudinal axis of the transverse axle to control said selective pivoting of the first steering knuckle and said at least one wheel about said first king pin and the second steering knuckle and said second at least one wheel about said second king pin.

6. The steering assembly of claim 5, wherein the conjoint pivotal motion about the respective king pins extends about 25 degrees to either side of a neutral forward position.

7. The steering assembly of claim 5, further comprising a controller coupled to the first and second hydraulic cylinders and linked with a traction unit steering mechanism to control the cylinders in response to operator steering actions and aid the tilling implement to follow the traction unit through turns.

8. The steering assembly of claim 5, wherein the first and second hydraulic cylinders are configured to be operator actuable independent of any other operator actuable steering mechanism.

* * * * *